No. 673,075. Patented Apr. 30, 1901.
M. E. DOUANE.
REFRIGERATING APPARATUS.
(Application filed Feb. 1, 1900.)
(No Model.)
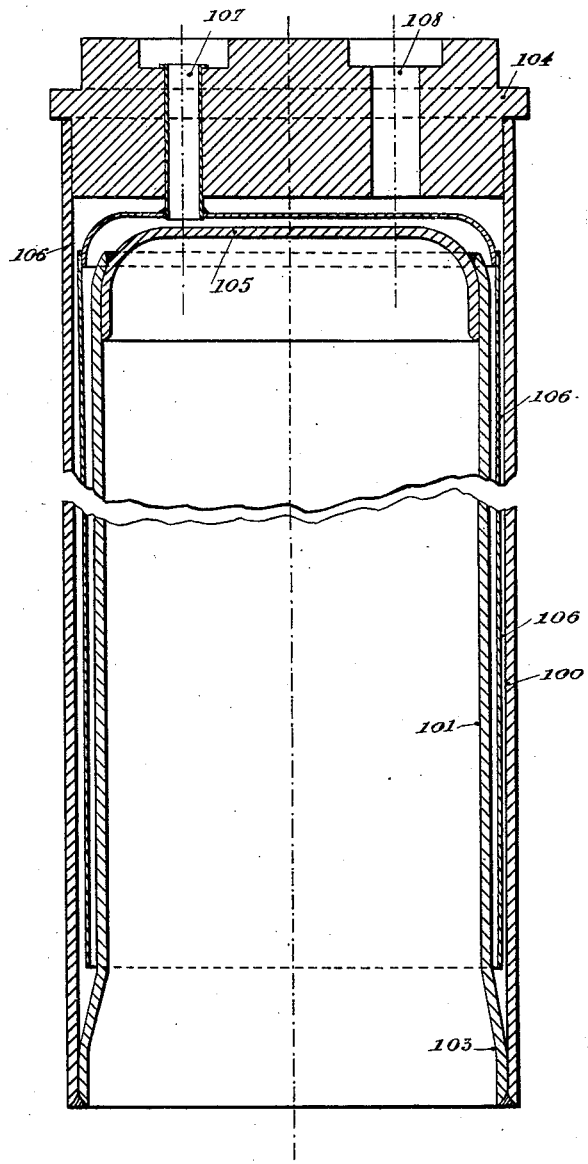
Witnesses:-
Henry Thierne.
George Barry Jr.
Inventor:-
Maurice Ernest Douane
by attorneys
Brown & Seward

UNITED STATES PATENT OFFICE.

MAURICE ERNEST DOUANE, OF PARIS, FRANCE.

REFRIGERATING APPARATUS.

SPECIFICATION forming part of Letters Patent No. 673,075, dated April 30, 1901.

Application filed February 1, 1900. Serial No. 3,591. (No model.)

*To all whom it may concern:*

Be it known that I, MAURICE ERNEST DOUANE, a citizen of the Republic of France, and a resident of Paris, France, have invented a new and useful Improvement in Refrigerating Apparatus, of which the following is a specification.

This invention relates to refrigerating apparatus working with volatile liquid. Its object is to provide a cooler which though occupying little space and having small capacity for the reception of the volatile fluid presents a large surface for its circulation and evaporation, thereby when used for the production of ice causing a rapid formation of uniform layers thereof, such a cooler also affording great facility for the removal of the ice layers therefrom.

The accompanying drawing represents a vertical section of a cooler embodying my invention. This cooler consists of two concentric tubes 100 and 101 of little difference of diameter, joined at their lower end 103. The outer tube 100 has a cover 104 and the inner tube 101 has a cover 105. The annular space between the tubes and the space between their covers constitute the chamber wherein the volatile refrigerating liquid expands. In order to obtain circulation of the volatile liquid favorable for exchange of heat through the tube-walls, there is arranged within the refrigerating-chamber a directing bell-tube 106, the cylindrical part of which descends in the annular space between the tubes 100 and 101. Through the cover 104 of the outer tube 100 and the head of the bell-tube 106 there enters the pipe 107, supplying the refrigerating liquid to the annular chamber of the cooler, and through the cover of the outer tube 100 there is an opening 108 for the issue of the vapors generated in the annular chamber by the heat abstracted from the matters to be cooled. Thus the liquid entering by 107 circulates first along the interior tube 101, when it vaporizes, and the vapor passing between the directing-tube and the outer tube 100 is discharged by 108. This circulation might be reversed—that is to say, the liquid might be sent first along the outer tube 100 and the vapor might ascend along the tube 101. In that case the liquid would enter by 108 and the vapor would issue by 107. This cooler is to be placed in a suitable vessel or receptacle for the material to be cooled, and suitable means not necessary to be herein shown and described—a circulating-pump and a cooler, for example—must be provided for the introduction of cool volatile refrigerating liquid through one of the pipes 107 108 and the exit of the vapors through the other of said pipes.

In the operation there is energetic circulation of a thin layer of refrigerating liquid along the metal walls of the cooler, which promotes good transmission of heat and also uniform utilization of the tube-surface for such transmission. By the employment of the directing-tube 106 ice is uniformly produced along the walls of the tubes 100 and 101, showing that all parts of the surface of these tubes have the same refrigerating efficiency; but without this directing-tube a great thickness of ice would be formed at the lower part of the cooler, while the rest of the surface of the tubes would have only a pellicle of ice.

The annular space between the tubes 100 and 101 may be made of capacity so small that it may always be quite filled with refrigerating liquid even when the charge of this liquid in the refrigerating apparatus is considerably reduced—for instance, by losses during long working.

The cooler is particularly well adapted to the manufacture of ice, because after the ice has been formed to a suitable thickness on the walls of the chamber it may be quickly detached by passing through the refrigerating-chamber a small quantity of refrigerating liquid which has been previously warmed.

I reserve the right of giving the concentric tubes 100 and 101 any suitable form.

What I claim as my invention is—

In a refrigerating apparatus, a cooler consisting of two upright tubes arranged one within the other and united at their bottoms and having separate covers, and an interposed bell-tube, the outer tube having an opening in its cover and the bell-tube having an opening in its head, said opening in the bell-tube being provided with a pipe which passes through the cover of the outer tube, and the two openings serving respectively for the inlet and outlet for a volatile fluid to be used as the refrigerating agent, substantially as herein described.

In testimony that I claim the foregoing as my invention I have signed my name, in presence of two witnesses, this 17th day of January, 1900.

MAURICE ERNEST DOUANE.

Witnesses:
EDWARD P. MacLEAN,
ALCIDE FABE.